United States Patent [19]

Gift

[11] 4,341,883

[45] Jul. 27, 1982

[54] IMPACT RESISTANT BLENDS OF ACRYLATE THERMOPLASTIC WITH SEQUENTIALLY POLYMERIZED FOUR COMPOSITION PARTICULATE ADDITIVE

[75] Inventor: Warren H. Gift, Morrisville, Pa.

[73] Assignee: Plaskolite, Inc., Columbus, Ohio

[21] Appl. No.: 201,820

[22] Filed: Oct. 29, 1980

[51] Int. Cl.³ .................. C08L 33/12; C08L 51/00; C08F 265/06
[52] U.S. Cl. .................................... 525/82; 525/81; 525/85; 525/304; 525/305; 525/308; 525/309; 525/902
[58] Field of Search .............. 525/82, 85, 305, 308, 525/309, 81

[56] References Cited

U.S. PATENT DOCUMENTS

| | | | |
|---|---|---|---|
| 3,450,796 | 6/1969 | Griffin | 260/885 |
| 3,793,402 | 2/1974 | Owens | 260/876 |
| 3,808,180 | 4/1974 | Owens | 260/885 |
| 3,843,753 | 10/1974 | Owens | 260/876 |
| 4,180,529 | 12/1979 | Hofmann | 525/85 |

Primary Examiner—Carman J. Seccuro
Attorney, Agent, or Firm—Porter, Wright, Morris & Arthur

[57] ABSTRACT

A four composition particulate additive for blending with a moldable acrylic matrix resin is described. The particulate additive optimizes four sequenced formulations: (1) beginning with a cross-linked elastomer core upon which (2) a successive layer of the principal quantity of cross-linked elastomer, which includes a graft-linking component, is polymerized, which in turn is (3) protectively encapsulated by a successively polymerized thermoplastic shell, which also includes a graft-linking component, and in turn is coated by (4) a final thermoplastic transition coating which is compatible with the matrix resin. The particle is chemically bonded into a unit and provides a graduated transition between the significantly different properties of the principal elastomer in the particle and the matrix resin with which the particles are blended. The blends produced are particularly useful in glazing and the production of sanitary-ware and other products in which impact resistance is a desired quality.

9 Claims, 2 Drawing Figures

IMPACT RESISTANT BLENDS OF ACRYLATE THERMOPLASTIC WITH SEQUENTIALLY POLYMERIZED FOUR COMPOSITION PARTICULATE ADDITIVE

SUMMARY OF THE INVENTION

This invention provides a multi-layered successively polymerized particulate additive for addition to a thermoplastic matrix resin to produce a blend. When the particles are blended with the matrix resin, an extrudable plastic having an enhanced resistance to destructive impact is produced. The particulate additive optimizes four sequenced formulations: (1) beginning with a cross-linked elastomer core upon which (2) a successive layer of the principal quantity of cross-linked elastomer, which includes a graft-linking component, is polymerized, which in turn is (3) protectively encapsulated by a successively polymerized thermoplastic shell, which also includes a graft-linking component, and in turn is coated by (4) a final thermoplastic transition coating which is compatible with the matrix resin. The particle is chemically bonded into a unit and provides a graduated transition between the significantly different properties of the principal elastomer in the particle and the polymer of the thermoplastic matrix resin with which the particles are blended. The blends produced are particularly useful in glazing applications and the production of sanitaryware and other products in which impact resistance is a desired quality.

BACKGROUND OF THE PRIOR ART

In the prior art it is known that the breaking resistance qualities of a moldable rigid thermoplastic with respect to an impact are enhanced by the addition of an elastomeric component to the thermoplastic. Typically, the elastomeric component is introduced into the thermoplastic by blending a proportion of an elastomer containing "particle" with a thermoplastic resin. Examples of such types of additive particles and blends are described, for example, in the specifications of U.S. Pat. Nos. of Griffin et al., 3,450,796, issued on June 17, 1969 entitled "Production of Thermoplastic Polymeric Materials;" Owens, 3,793,402 issued Feb. 19, 1974 entitled "Low Haze Impact Resistant Composition Containing A Multi-Stage Sequentially Produced Polymer," and 3,808,180 and 3,843,753 respectively issued Apr. 30, 1974 and Oct. 22, 1974, both entitled "Composite Interpolymer and Low Haze Impact Resistant Thermoplastic Compositions Thereof;" and Hofmann, 4,180,529, issued Dec. 25, 1979 entitled "Acrylic Multistage Graft Copolymer Products and Processes."

Such particulate additives are produced by successive and ordered emulsion polymerizations which usually provide alternating elastomeric and rigid thermoplastic components, beginning with a first "core" or "seed" particle. The art, such as that identified above, describes various ordered arrangements of elastomeric and thermoplastic "stages" in such particles. In this manner, a layered particle is produced which is then blended with a principal proportion of matrix thermoplastic, the impact properties of which it is desired to enhance. Typically, the outer shell of such particles is a thermoplastic which is compatible for blending with the matrix thermoplastic. Further, such layered particles have also included various co-polymeric cross-linking and graft-linking components in the elastomeric and thermoplastic stages of the particle.

Such layered particles conventionally require precise process control during the emulsion polymerizations to achieve optimum results. Various difficulties may be encountered in terms of control over the formulation and the time and temperature cycles required for the successive emulsion polymerizations.

It has heretofore been a principle in the art that the composition of an individual layer in such a particle cannot be characterized apart from the properties of the particle as a whole. In seeking to achieve useful varieties of such particles, the art has varied the monomer and co-monomer formulations which produce the successively polymerized stages in layered particles, and in so doing, has generally alternated elastomeric and thermoplastic layers to provide a particle for blending which contains the predetermined quantity of elastomer which is necessary to be introduced into and blended with the matrix polymer to produce the required degree of impact resistance.

OBJECTS OF THE INVENTION

In contrast with simply providing a quantity of elastomer, in the form of layers in an emulsion polymerized particle, to a matrix resin to produce a degree of impact resistance, the additive of the present invention provides an optimum particle in which the composition of each consecutive "layer" in the particle is adapted to the functional properties of the particle as a whole, and the relationship of the properties of any particular composition is adapted to the properties of the preceding and/or successive (as appropriate) compositions which constitute "layers" in the particle. A graduated transition between the normally incompatible properties of the thermoplastic matrix resin and the elastomer is achieved when the particles are blended.

The present invention treats a particle intended to be an impact additive, as if each of the particle's sequential component compositions performed a (1) designated function within the particle itself, and (2) in the aggregate of all the sequential compositions, contributed to the overall properties of the particle as a whole. Thus, in the following specification, a particle is described in which "layer" compositions are characterized separately from the properties of the particle as a whole. The sequenced arrangement of "layers" having specified and predetermined properties, which in turn are based on different formulation compositions, results in a particle which aggregately possesses the individual properties of each of the co-polymeric layers when the particle is blended into the thermoplastic matrix resin. The properties of the layers of the compositions in the particle are "graduated" from the core to the outer surface; the result is a cohesive incorporation of elastomer into a thermoplastic resin in a blend. The particle thus described provides an elastomeric additive for modifying the properties of a moldable thermoplastic. The particle is an elastomer containing additive for blending with a moldable thermoplastic in a wide range of proportions to produce blends which exhibit the predetermined degree of impact resistance desired for applications in glazing, sanitaryware and other molded or extruded products.

Further objects and achievements of the particle and blend of the Specification are set forth with reference to the drawings and the following description of the preferred embodiment.

DESCRIPTION OF THE DRAWINGS

FIG. I is a schematic representation of the ordered compositions of an additive particle of the invention.

FIG. II shows the sequential steps in production of a thermoplastic blend in accord with the invention.

DESCRIPTION OF THE PREFERRED EMBODIMENT

Figure 1:
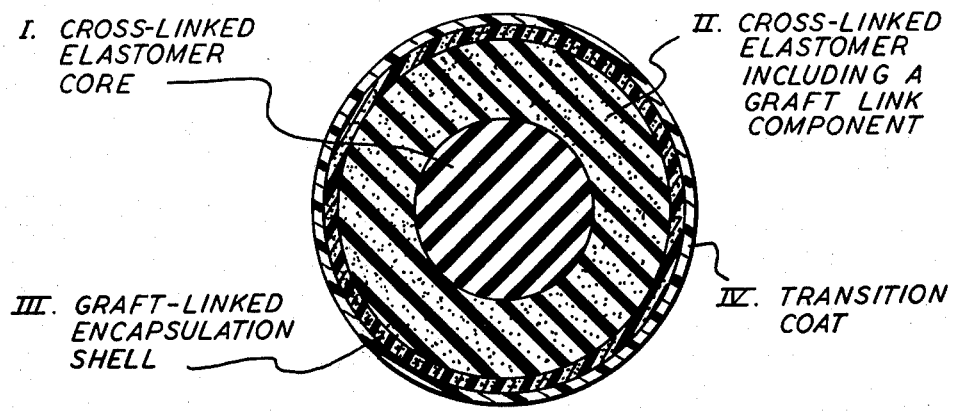
Figure 2:
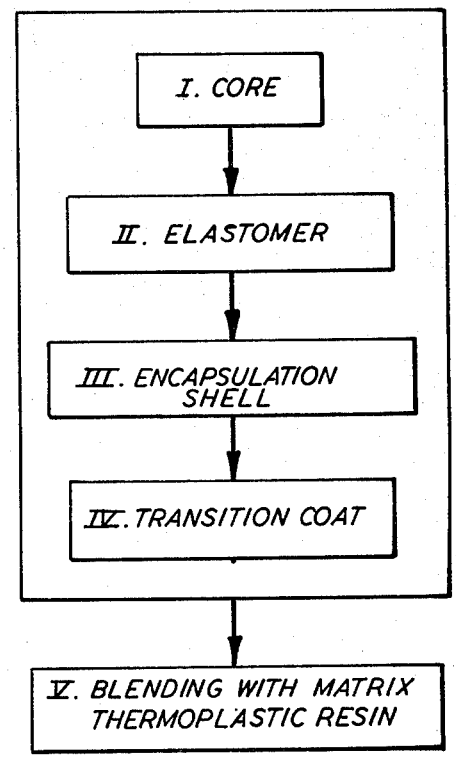

Additive particles of the present Specification are produced by conventional and known procedures for sequential emulsion polymerization such as are described in the previously referred to patents of Griffin, Owens, and Hofmann. The preferred embodiment is a sequentially produced particle which may be characterized in terms of its layer compositions beginning with an initial elastomeric core. The particles are thereafter blended with a moldable acrylic thermoplastic to improve the impact resisting properties of the blended composition. The particle is produced by the successive emulsion polymerizations of:

(a) an initial elastomeric core (5 to 15 weight percent of the particle) which is polymerized from a mixture including a principal portion of over 50 weight percent of a lower alkyl acrylate monomer and up to 5 weight percent of a compatible principally cross-linking functional co-monomer;

(b) a next principal elastomer (45 to 65 weight percent of the particle) surrounding the core which is polymerized from a mixture including a principal portion of over 50 weight percent of a lower alkyl acrylate monomer; up to 5 weight percent of a compatible principally cross-linking functional co-monomer; and up to 5 weight percent of a compatible principally graft-linking functional co-monomer;

(c) an encapsulation shell (15 to 25 weight percent of the particle) for the elastomer which consists of a non-elastomeric thermoplastic polymerized from a mixture including a principal portion of over 85 weight percent of a lower alkyl methacrylate and up to 5 weight percent of a principally graft-linking functional co-monomer; and (d) a final transition coating (10 to 20 weight percent of the particle) surrounding the encapsulation shell which consists of a rigid thermoplastic polymer which is polymerized from a monomer mixture which produces an outer polymer shell compatible with the moldable acrylic thermoplastic with which the particulate additive is to be blended. For particles to be blended with an extrudable acrylic molding resin, the monomer mixture of the transition coating will typically include over 85 weight percent of a lower alkyl methacrylate.

In addition, the monomer formulations of the core and elastomer may include, optionally, a balance portion of up to about 50 weight percent of a co-polymerizable monoethylenically unsaturated monomer. The monomer formulations of the encapsulation shell and transition coating may also optionally include a balance portion of up to about 15 weight percent, of a co-polymerizable monoethylenically unsaturated monomer. Further, the transition coating may optionally include a minor amount, up to 1 weight percent, of a mercaptan chain control agent, such as lauryl mercaptan, or other known agents which serve to regulate the molecular weight of a polymerizing monomer mixture.

The monomers employed are conventionally known in the art. As used herein "lower alkyl" refers to a monomer in which the alkyl includes 1 to 8 carbon atoms. Also, unless otherwise expressly indicated as optional herein, the use of the phrase "up to" in the specification of the formulation requires the presence of at least a functional amount of the monomer set forth. The "balance" portion in reference to the optional co-monomer refers to the remainder of a formulation mixture after the necessary amounts of the principal monomer and the functional co-monomer[s] or other additives are provided. When the optional co-monomers are not provided in the formulation, then it is intended that the principal monomer portions aggregate the balance of the formulation after the functional co-monomers are provided in a predetermined proportion of the "up to" weight percent set forth.

Thus, the lower alkyl acrylate of the core and the elastomer can be methyl acrylate, ethyl acrylate, propyl acrylate, butyl acrylate, 2-ethylhexyl acrylate, etc. Butyl acrylate is preferred.

The principally cross-linking functional co-monomer used in the core and elastomer can be ethylene glycol dimethacrylate, 1,3-butylene glycol dimethacrylate, 1,4-butylene glycol dimethacrylate, propylene glycol dimethacrylate, divinyl benzene, trivinyl benzene, ethylene glycol diacrylate, 1,3-butylene glycol diacrylate or the like. 1,3-butylene glycol diacrylate ("butylene diacrylate") is preferred.

The principally graft-linking functional co-monomer used in the elastomer and encapsulation shell can be allyl acrylate, allyl methacrylate, diallyl maleate, diallyl fumarate, crotyl methacrylate, crotyl acrylate, etc. Allyl methacrylate is preferred.

The lower alkyl methacrylate of the encapsulation shell and the transition coating can be methyl methacrylate, ethyl methacrylate, propyl methacrylate or butyl methacrylate, etc. Methyl methacrylate is preferred.

Finally, the optional co-polymerizable monoethylenically unsaturated monomer for each formulation can be a lower alkyl acrylate, lower alkyl methacrylate, styrene, A-methyl styrene, monochlorostyrene, butyl styrene, acrylonitrile, methacrylonitrile, or the like. Regarding the optional addition of a co-polymerizable monoethylenically unsaturated co-monomer to the elastomer core and the principal elastomer, the preferred optional co-monomer is styrene which in various proportions may be used to modify the refractive index of the elastomer co-polymer when a clear and transparent blend is required or when economic dictates so provide. The preferred optional co-monomer for the encapsulation shell and transition coat is ethyl acrylate when the particles are intended to be blended with a conventional extrudable acrylic co-polymer resin. Typically, when the particles of the invention are intended for blending with such an extrudable acrylic resin, the composition of the monomer mixture of the transition coating will usually include over 90 weight percent methyl methacrylate and up to 10 weight percent ethyl acrylate.

The particles of this invention should preferably have a final size in the range of 0.15 to 0.35 micron, with a uniformly large particle size within this range preferred. The amount of particulate additive employed in a blend is dependent upon the modification of properties ultimately desired. Generally, the particulate additive will be present in an amount of about from 5 to 80 percent by weight of blend and preferably from about 30 to 60 weight percent. The additive and the matrix resin can be blended by any known procedure such as those described in the aforesaid Owens, Griffin and Hofmann patent.

EXAMPLE I

To produce an impact resistant blend in accord with the invention the following formulation and process is employed.

| Monomer Mixture Composition | Preferred Formulation | Weight Percent |
|---|---|---|
| I. Elastomer core: | | |
| N-butyl acrylate | 17.97 lb. | Over 50% |
| Butylene diacrylate | .11 lb. | Up to 5% |
| Styrene (optional) | 4.00 lb. | Up to almost 50% |
| II. Principal elastomer: | | |
| N-butyl acrylate | 98.85 lb. | Over 50% |
| Allyl methacrylate | 1.83 lb. | Up to 5% |
| Butylene diacrylate | .61 lb. | Up to 5% |
| Styrene (optional) | 22.46 lb. | Up to almost 50% |
| III. Encapsulation shell: | | |
| Methyl methacrylate | 42.56 lb. | Over 85% |
| Allyl methacrylate | .1875 lb. | Up to 5% |
| Ethyl acrylate (optional) | 2.25 lb. | Up to almost 15% |
| IV. Transition coating: | | |
| Methyl methacrylate | 32.06 lb. | Over 85% |
| Ethyl acrylate (optional) | 1.68 lb. | Up to almost 15% |
| Mercaptan chain control agent (optional) | .10 lb. | Up to almost 1% |

The monomer mixtures are sequentially polymerized in an emulsion reactor at a constant controlled temperature of 80° C. Continuous agitation is provided. The following procedure is employed:

| Elapsed Time | |
|---|---|
| | 1. Charge 375 lb. deionized water, add .225 lb. Aerosol OT 75, at initial temperature of 79° C. and begin agitation. |
| 0 | 2. Add Core Monomer Mixture I to the reactor. |
| 15 | 3. After 15 minutes, add 2,040 cc. of 1% K$_2$S$_2$O$_8$ [Potassium Persulphate ("PPS")] solution in deionized water. |
| 45 | 4. After 30 minutes, add 2,040 cc. of % PPS solution. |
| 105 | 5. After 60 minutes, add 4250 cc. of 1% PPS solution. |
| | 6. Add .14219 lb. Aerosol OT 75 to reactor. |
| 110 | 7. After 5 minutes, begin feeding Principal Elastomer Monomer Mixture II to reactor at rate of 3 lb. per minute. |
| 150 | 8. After 40 minutes, add 4,250 cc. of 1% PPS solution. |
| 251 | 9. After 101 minutes, add 2,040 cc. of 1% PPS solution. |
| | 10. Add .33 lb. Aerosol OT 75 to reactor. |
| 257 | 11. After 6 minutes, begin feeding Encapsulation Shell Monomer Mixture III at rate of 1.87 lb. per minute. [All of Encapsulation Stage is in reactor after 25 minutes.] |
| 297 | 12. After 15 minutes add 2,040 cc. of 1% PPS solution. |
| 302 | 13. After 5 minutes, begin feeding Transition Coating Monomer Mixture IV at rate of 1.13 lb. per minute. [All of Transition Stage is in reactor after about 30 minutes.] |
| 357 | 14. After about 25 minutes, cool batch to room temperature. |
| | 15. Strain emulsion and store. Total elapsed time: 357 minutes |

The emulsion is purified and the particles are coagulated. The particles are blended with an extrudable thermoplastic acrylic co-polymer matrix resin of an approximately 95/5 proportion of poly-methylmethacrylate/poly-ethylacrylate. The blend consists of 40% particles and 60% matrix polymer. Extruded into a 0.10 inch sheet, the blend will provide a sheet having Gardner Impact of 45 in.-lbs. in accord with Proposed ASTM Method B.

EXAMPLE II

A comparison of the formulation of Example I is made with the particle formulation of Example 10 of U.S. Pat. No. 4,180,529 referred to above. The particulate additive of U.S. Pat. No. 4,180,529 includes layers (including the core) in an essentially alternating sequence of elastomer/thermoplastic. The particles compare as follows:

| U.S. Pat. No. 4,180,529 | Percent | Example I | Percent |
|---|---|---|---|
| (1) "Seed" (optional). | 3 | | |
| (2) Elastomer with principally graft-linking component. | 17 | (1) Cross-linked elastomer. | 10 |
| (3) Rigid layer with principally graft-linking component. | 10 | (2) Cross-linked elastomer with graft-linking component. | 55 |
| (4) Elastomer with principally graft-linking component | 55 | (3) Rigid encapsulation shell with graft-linking component. | 20 |
| (5) Rigid thermoplastic outer shell. | 15 | (4) Thermoplastic transition coating. | 15 |

Instead of providing successively alternating elastomer/rigid composition layers as does U.S. Pat. No. 4,180,529, the particle of the invention Example I includes successive compositions in a graduated relationship with respect to physical properties of the compositions within the particle. Each "layer" of the particle of Example I is formulated to provide an optimum composition for any particular layer with respect to its function in the particle as a whole, and its relationship to the adjacent matrix media.

In this regard, the core of the Example I particle is in substance a cross-linked elastomer "foundation"; the surrounding elastomer provides the principal quantity of the elastomer necessary to produce impact resistance properties when the particle is blended with the matrix thermoplastic. The "encapsulation" layer is a durable thermoplastic composition which protects the elastomer during blending which occurs at high temperature (450°) and prevents the elastomer from shearing, break down or melting. The final "transition" stage, which is a molecular weight controlled co-polymer, provides compatibility of the entire particle with the matrix resin to allow quick and easy blending. Overall, the compatibility of the coating allows refractive index matching for transparency and viscosity matching of the particle with the thermoplastic matrix and optimizes moldability of the ultimate blend. The inclusion of the principally graft-linking co-monomer in the intermediate layers chemically bonds the entire particle so that, when blended, a uniform and graduated transition of physical properties occurs from the normally incompatible rigid thermoplastic properties of the matrix resin inwardly within the particle to the elastomeric properties of the cross-linked polymer which may also be refractive index matched with the matrix resin by the addition of styrene.

In summary, the particle of the invention (a) provides a correlation of each separate formulation to the function that a particular layer is intended to perform in its relationship to the particle as a whole and (b) correlates the number of layers and formulations to the function that the particle per se should exhibit in the matrix resin. For an impact additive intended to be blended with acrylic matrix resin, the particle of the invention may thus be considered to optimize four layer formulations.

While the foregoing specification describes the specific formulation of the preferred embodiment, it is known in the art that, without departing from the spirit of the invention, limited variations in formulation proportions from the ranges given may be made depending upon various predetermined requirements established for a desired blend. It is accordingly not intended to exclude from the scope of the specification, such other formulation variations of the preferred embodiment which will be evident to those having skill in the art.

What is claimed is:

1. A blend of from about 40 to 70 weight percent of an extrudable acrylate co-polymer resin with from about 60 to 30 weight percent of particles produced by the successive polymerizations, according to the following order, in the same emulsion of:
   a first monomer mixture, which produces a core for the particles that is approximately 10 weight percent of the particles, and includes a portion of up to 5 weight percent butylene diacrylate and the balance of the monomer mixture includes over 50 weight percent butyl acrylate;
   a second monomer mixture, which produces an elastomer within the particles that is approximately 55 weight percent of the particles, and includes a portion of up to 5 weight percent butylene diacrylate; a further portion of up to 5 weight percent allyl methacrylate; and the balance of the monomer mixture includes over 50 weight percent butyl acrylate;
   a third monomer mixture, which produces an encapsulation shell for the particles that is approximately 20 weight percent of the particles, and includes a portion of up to 5 weight percent of allyl methacrylate and the balance of the monomer mixture includes over 85 weight percent methyl methacrylate;
   a fourth monomer mixture, which produces a transition coating for the particles that is approximately 15 weight percent of the particles, and includes over 2. The blend of claim 1 in which:
   the first monomer mixture includes about 0.5 weight percent butylene diacrylate; about 81.4 weight percent butyl acrylate; and about 18.1 weight percent styrene;
   the second monomer mixture includes about 0.5 weight percent butylene diacrylate; about 1.5 weight percent allyl methacrylate; about 80 weight percent butyl acrylate; and about 18 weight percent styrene;
   the third monomer mixture includes about 0.5 weight percent allyl methacrylate; about 94.5 weight percent methyl methacrylate; and about 5 weight percent ethyl acrylate; and
   the fourth monomer mixture includes about 95 weight percent methyl methacrylate and about 5 weight percent ethyl acrylate.

3. The blend of claim 1 or of claim 2 in which the fourth monomer mixture includes up to 1 weight percent of an agent which serves to regulate the molecular weight of the polymerizing monomer mixture.

4. A blend of a moldable acrylate thermoplastic with 5 to 80 weight percent of additive particles which consist of a successively emulsion polymerized:
   (a) initial central elastomeric core, being from 5 to 15 weight percent of the particle, which is polymerized from a mixture including a principal portion of over 50 weight percent of a lower alkyl acrylate monomer and a portion of up to 5 weight percent of a compatible principally cross-linking functional co-monomer
   (b) a next principal elastomer, being from 45 to 65 weight percent of the particle, surrounding the core, which is polymerized from a principal portion of over 50 weight percent of a lower alkyl acrylate monomer; a portion of up to 5 weight percent of a compatible cross-linking functional co-monomer; and a further portion of up to 5 weight percent of a compatible principally graft-linking functional co-monomer which is capable of chemically bonding to the succeeding encapsulation shell;
   (c) a next encapsulation shell, being from 15 to 25 weight percent of the particle, which consists of a non-elastomeric thermoplastic polymerized from a mixture including a principal portion of over 85 weight percent of a lower alkyl methacrylate and includes a lesser portion of up to 5 weight percent of a compatible principally graft-linking functional co-monomer which is capable of chemically bonding to the succeeding coating; and
   (d) a final transition coating, being from 10 to 20 weight percent of the particle, surrounding the encapsulation shell, which consists of a rigid thermoplastic composition which is polymerized from a monomer mixture including a principal portion of over 85 weight percent of a lower alkyl methacrylate which produces an outer polymer coating of the particle which is compatible with the moldable acrylate thermoplastic with which the particle is blended.

5. A blend of a poly-methyl-methacrylate/poly-ethylacrylate co-polymer molding resin in accord with claim 4 in which, in the additive particles:
   (a) the initial elastomeric core is approximately 10 weight percent of the particle and is polymerized from a mixture including a principal portion of over 50 weight percent of butyl acrylate and up to 10 weight percent of butylene diacrylate;
   (b) the elastomer surrounding the core is approximately 55 weight percent of the particle and is polymerized from a mixture including over 50 weight percent of butyl acrylate; up to 5 weight percent of butylene diacrylate; and up to 5 weight percent of allyl methacrylate;
   (c) the encapsulation shell is approximately 20 weight percent of the particle and is polymerized from a mixture including a principal portion of over 50 weight percent of methyl methacrylate and up to 5 weight percent of allyl methacrylate; and
   (d) the final transition coating is approximately 15 weight percent of the particle and is polymerized from a mixture of over 90 weight percent of methylmethacrylate and up to 10 weight percent of ethyl acrylate.

6. The blend of claim 4 or claim 5 in which the monomer mixtures of at least one of the initial core and the elastomer surrounding the core include a portion of styrene as a co-monomer.

7. The blend of claim 4 or claim 5 in which the monomer mixture of the encapsulation shell includes a portion of ethyl acrylate as a co-monomer.

8. The blend of claim 4 or claim 5 in which the monomer mixture of the transition coating includes an agent which serves to regulate the molecular weight of the polymerizing monomer mixture.

9. The method of producing the blend of claim 1 or claim 4 wherein an extrudable poly-methyl-methacrylate/poly-ethyl-acrylate co-polymer having an enhanced degree of resistance to breaking impact is obtained, said method consisting of, (A) performing sequential polymerizations in the same emulsion in the following order:
  (1) preparing a first cross-linked elastomeric core particle in an emulsion polymerization and maintaining said particle in emulsion;
  (2) polymerizing upon the core particle in said emulsion a further layer of cross-linked elastomer, which includes a graft-linking co-polymer;
  (3) encapsulating said elastomer in said emulsion with a thermoplastic co-polymer shell of poly-methylmethacrylate/poly-ethylacrylate and graft-linking copolymer;
  (4) providing in said emulsion a transition coating of a poly-methyl-methacrylate/poly-ethylacrylate co-polymer over the encapsulation polymer; and
(B) thereafter blending a proportion of the sequentially polymerized polymer particles prepared in said emulsion with a proportion of an extrudable poly-methylmethacrylate/poly-ethyl-acrylate co-polymer.

* * * * *

UNITED STATES PATENT AND TRADEMARK OFFICE
CERTIFICATE OF CORRECTION

PATENT NO. : 4,341,883
DATED : July 27, 1982
INVENTOR(S) : Warren H. Gift

It is certified that error appears in the above-identified patent and that said Letters Patent are hereby corrected as shown below:

In Column 5, line 28:

"- -10 lb.- -" presently appearing is corrected to
"- -.10 lb.- -"

In Column 7, line 54 (Claim 1):

after the word "- -over- -" there should be inserted the following: "- -90 weight percent of methyl methacrylate and a portion of ethyl acrylate.- -"

Signed and Sealed this

Twenty-eighth Day of December 1982

[SEAL]

Attest:

GERALD J. MOSSINGHOFF

Attesting Officer

Commissioner of Patents and Trademarks